(12) United States Patent  
Chuang

(10) Patent No.: US 7,187,367 B2  
(45) Date of Patent: Mar. 6, 2007

(54) TOUCH PANEL

(76) Inventor: Meng-Ju Chuang, No. 8, Alley 4, Lane 164, Gaufeng Rd., Hsinchu (TW) 300

( * ) Notice: Subject to any disclaimer, the term of this patent is extended or adjusted under 35 U.S.C. 154(b) by 311 days.

(21) Appl. No.: 10/443,583

(22) Filed: May 22, 2003

(65) Prior Publication Data

US 2004/0233175 A1    Nov. 25, 2004

(51) Int. Cl.  
G09G 5/00    (2006.01)

(52) U.S. Cl. .................. 345/173; 178/18.01

(58) Field of Classification Search ........ 345/173–179; 178/18.01, 18.05  
See application file for complete search history.

(56) References Cited

U.S. PATENT DOCUMENTS

| 6,784,876 | B1 * | 8/2004 | Nagai et al. ............. 345/178 |
| 2002/0031622 | A1 * | 3/2002 | Ippel et al. .............. 428/1.6 |
| 2003/0201985 | A1 * | 10/2003 | Katakami .................. 345/173 |

FOREIGN PATENT DOCUMENTS

TW    422999    2/2001

* cited by examiner

Primary Examiner—Richard Hjerpe  
Assistant Examiner—Duc Q Dinh  
(74) Attorney, Agent, or Firm—Quintero Law Office

(57) ABSTRACT

A touch panel including a top transparent substrate coated with a top conductive film on its lower surface; a bottom transparent substrate coated with a bottom conductive film on its upper surface; an insulating spacer located between the two conductive films of the top and bottom transparent substrates to separate the two conductive films; and a plurality of signal lines, each signal line is disposed on an edge of the top or bottom conductive film and is separated from another conductive film or another signal line by an adhesive. The feature of the present invention resides in that a first trench is provided on an edge of the lower surface of the top transparent substrate and a signal line is disposed on the top conductive film in the first trench, or a second trench is provided on an edge of the upper surface of the bottom transparent substrate and a signal line is disposed on the bottom conductive film in the second trench.

18 Claims, 5 Drawing Sheets

TOUCH PANEL

BACKGROUND OF THE INVENTION

1. Field of the Invention

The present invention relates to a touch panel, and more particularly to a touch panel in which the silver lines occupy a smaller space, thus increasing the active area.

2. Description of the Prior Art

FIG. 1 is a front view showing the signal line structure of a conventional four-line touch panel. FIG. 2a is a cross-section taken along line A–A' of FIG. 1. Referring to FIGS. 1 and 2a, the touch panel includes a top transparent substrate 100, a bottom transparent substrate 200, and an insulating spacer 600. An ITO (indium tin oxide) film 120 is coated on the lower surface of the top transparent substrate 100, and an ITO film 220 is coated on the upper surface of the bottom transparent substrate 200. The insulating spacer 600 is disposed between the ITO film 120 of the top transparent substrate 100 and the ITO film 220 of the bottom transparent substrate 200 to separate the two ITO films.

The so-called four-line touch panel indicates that the touch panel has a total of four signal sensing lines for sensing a signal. As shown in FIG. 1, top signal sensing lines 310 and 320 are disposed on two opposite edges of the top ITO film 120. Bottom signal sensing lines 410 and 420 are disposed on two opposite edges of the bottom ITO film 220. In addition, the touch panel further has four finer signal transmission lines, that is, a signal transmission line 310a connected to the signal sensing line 310, a signal transmission line 320a connected to the signal sensing line 320, a signal transmission line 410a connected to the signal sensing line 410, and a signal transmission line 420a connected to the signal sensing line 420. These four signal transmission lines transmit the sensed signals.

An adhesive (such as a double-sided adhesive 500) is disposed between the edges of the top and bottom ITO films 120 and 220, in order to separate the signal line from another ITO film or from another signal line. The area on the edges of the panel, in which signal lines are located, is referred to as a signal line area and is labeled "S". The area outside the signal line area is an active area (AA).

When the top transparent substrate 100 is touched by an external force, such as a finger or stylus, electric contact occurs between the two ITO films 120 and 220, thus generating electric voltage. The signal is sensed by the signal sensing lines 310, 320, 410 and 420, and is then transmitted via signal transmission lines 310a, 320a, 410a, and 420a.

As shown in FIG. 2a, symbol 320a is the signal transmission line on the top ITO film 120 and symbols 410 and 420 are the signal sensing lines on the bottom ITO film 220. To aid in understanding, the width ratio of the signal line area S in FIG. 2a is magnified in comparison with FIG. 1. It is to be understood from FIGS. 1 and 2a, that the silver line (signal line) arrangement of the conventional touch panel has the following disadvantages.

(1) The double-sided adhesive 500 is flat, but the silver line is of a protruding shape. Use of a flat double-sided adhesive to fasten the protruding silver line, reduces reliability.

(2) The thickness of the silver line is limited. In order to provide high conductivity, the width of the silver line is frequently increased, resulting in a larger overall appearance size.

(3) When the silver lines 320a and 420 between the two ITO films 120 and 220 are correspondingly aligned (as shown in FIG. 2b), the silver lines protrude, and short circuits easily occur between the two silver lines. Therefore, in order to maintain better insulation between silver lines, the top and bottom layer silver lines are disposed with an alternative alignment. For example, the silver lines 320a and 420 in FIG. 2a are disposed with an alternative alignment. Thus, the silver lines must occupy more space, causing a larger appearance size.

SUMMARY OF THE INVENTION

Therefore, an object of the present invention is to solve the above-mentioned problems and provide a touch panel in which the silver lines occupy a smaller space to provide a smaller appearance size. The silver lines maintain high conductivity and good reliability.

To achieve the above object, the touch panel of the present invention includes a top transparent substrate coated with a top conductive film on its lower surface; a bottom transparent substrate coated with a bottom conductive film on its upper surface; an insulating spacer located between the two conductive films of the top and bottom transparent substrates to separate the two conductive films; and a plurality of signal lines, each of which is disposed on an edge of the top or bottom conductive film and is separated from another conductive film or another signal line by an adhesive. When the top transparent substrate is touched by an external agent, electric contact occurs between the two conductive films. The feature of the present invention resides in that a first trench is provided on an edge of the lower surface of the top transparent substrate and a signal line is disposed on the top conductive film in the first trench, or a second trench is provided on an edge of the upper surface of the bottom transparent substrate and a signal line is disposed on the bottom conductive film in the second trench.

DETAILED DESCRIPTION OF THE INVENTION

Figure 1:
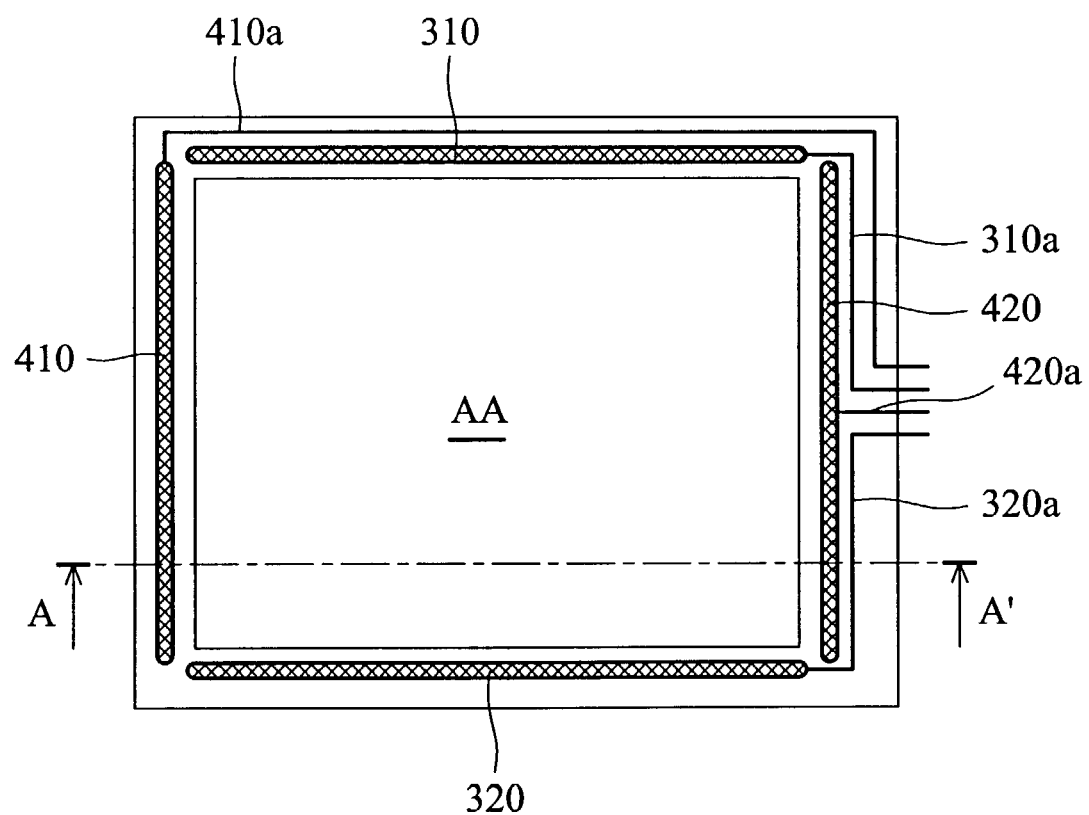
FIG. 1 is a front view showing the signal line structure of a conventional four-line touch panel.
Figure 2A:
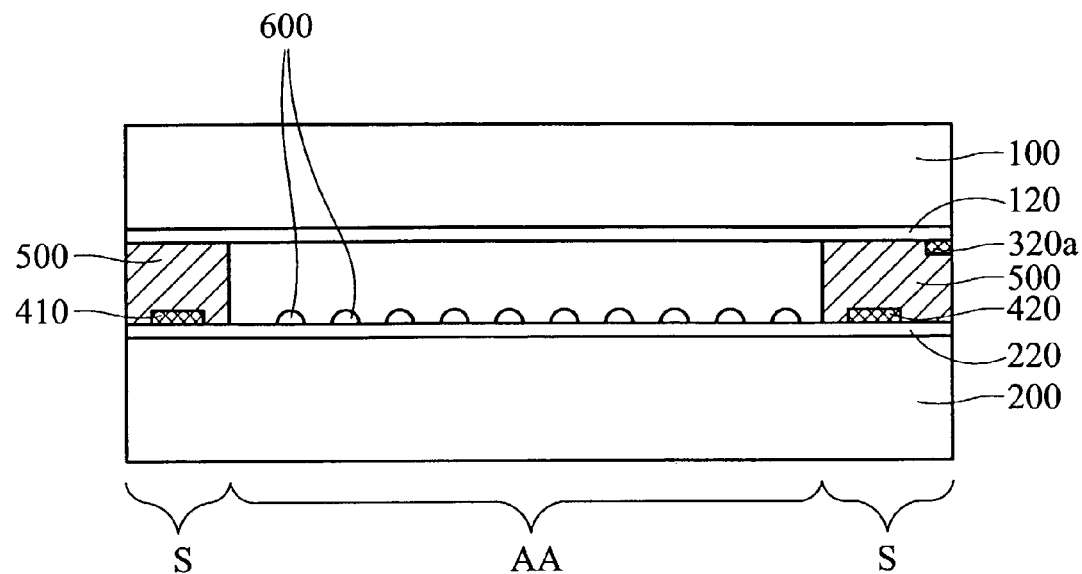
FIG. 2a is a cross-section taken along line A–A' of FIG. 1, showing the alternatively aligned silver lines on top and bottom layers.
Figure 2B:
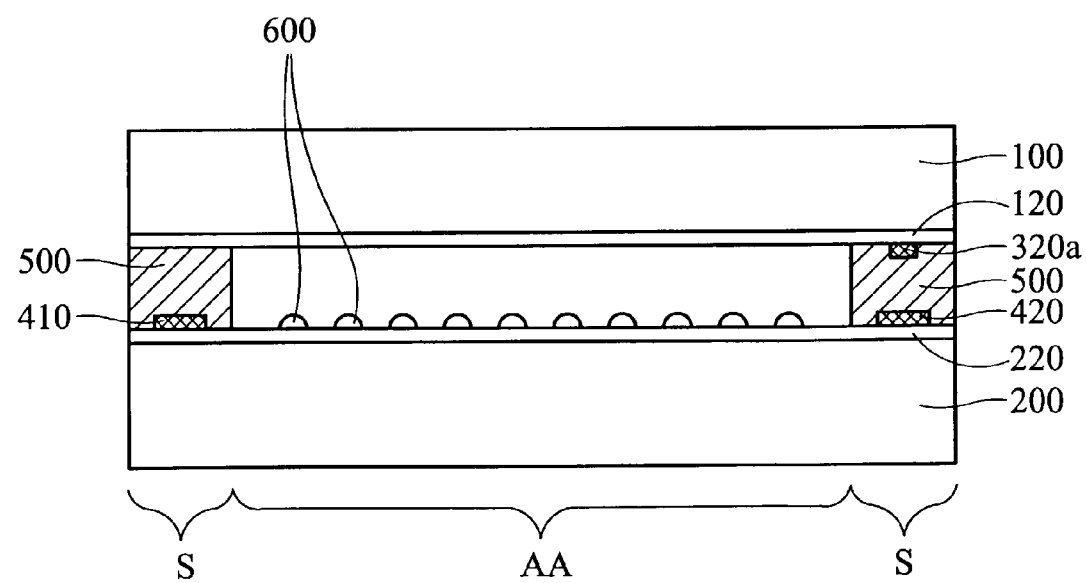
FIG. 2b is a cross-section taken along line A–A' of FIG. 1, showing the correspondingly aligned silver lines on top and bottom layers.
Figure 3:
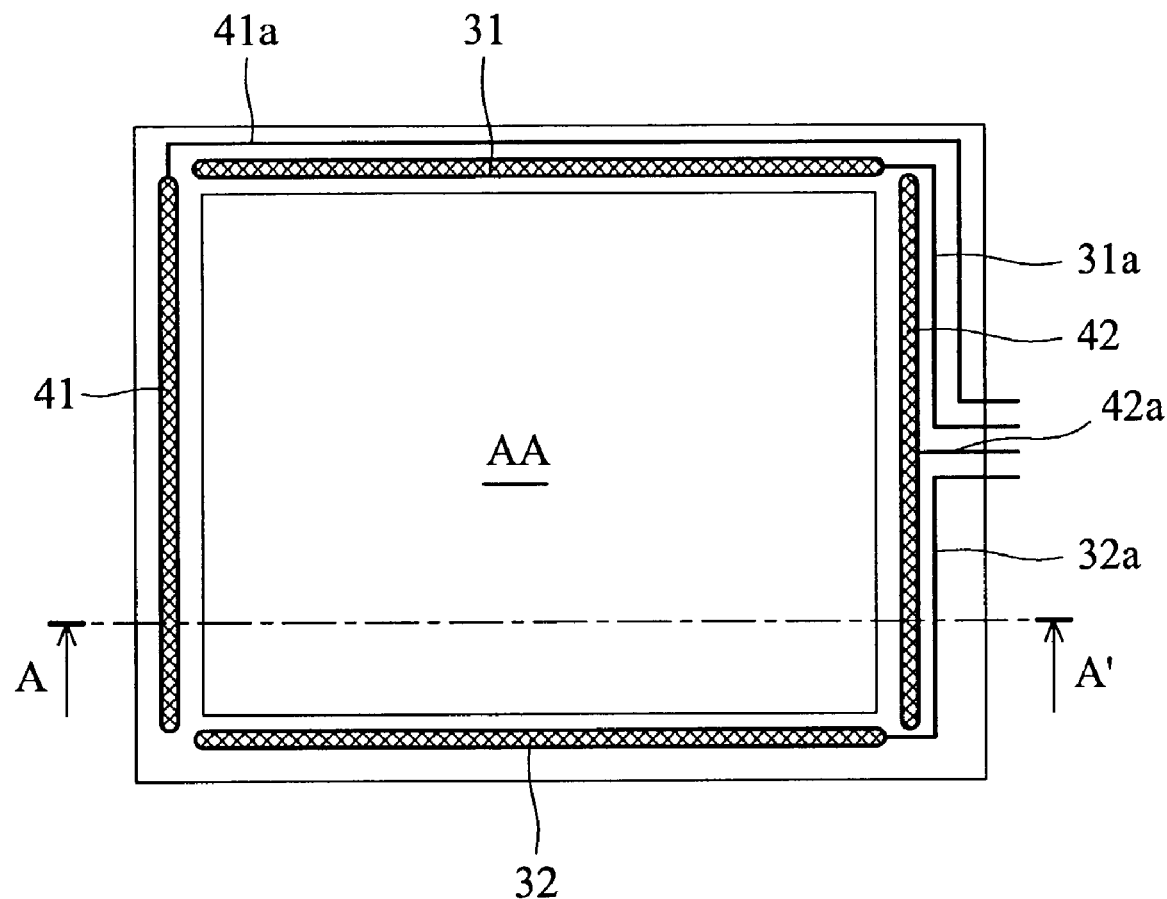
FIG. 3 is a front view showing the signal line structure of the four-line touch panel according to a preferred embodiment of the present invention.
Figure 4A:
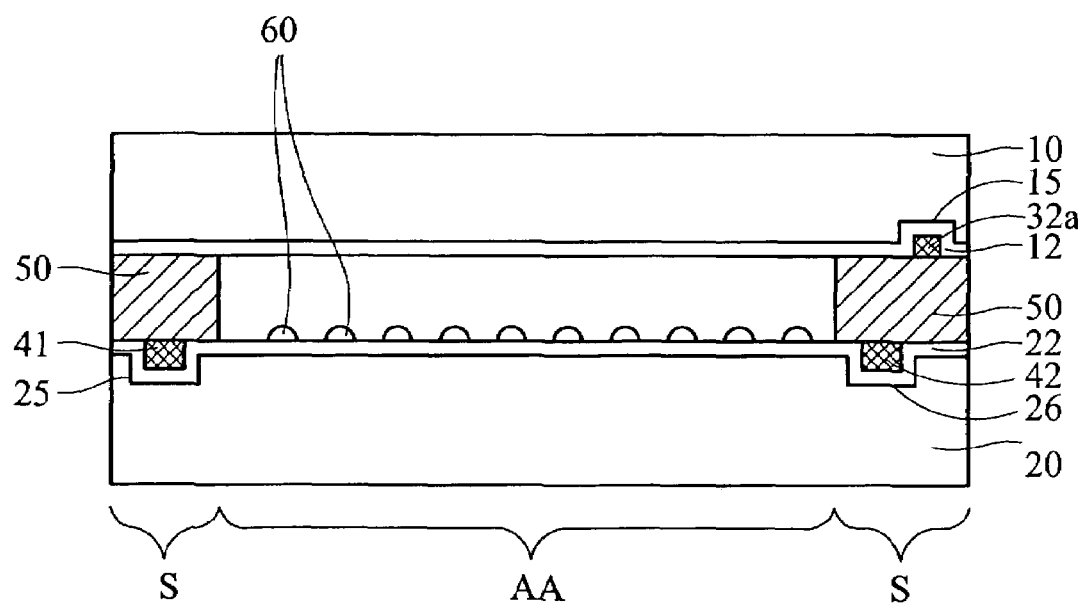
FIG. 4a is a cross-section taken along line A–A' of FIG. 3, showing the alternatively aligned signal lines on top and bottom layers.

FIG. 3 is a front view showing the signal line structure of a four-line touch panel according to a preferred embodiment of the present invention. FIG. 4a is a cross-section taken along line A–A' of FIG. 3. Referring to FIGS. 3 and 4a, the touch panel of the present invention includes a top transparent substrate 10, a bottom transparent substrate 20, an insulating spacer 60, and a plurality of signal lines. The top and bottom transparent substrates suitable for use in the present invention can be glass or plastic. For example, the top and bottom transparent substrates can be polyester plastic, with PET (polyethylene terephthalate) being a representative example. Preferably, the top transparent substrate is flexible plastic suitable for being touched.

An edge of the lower surface of the top transparent substrate 10, is provided with a trench 15. A top conductive film 12 is coated on the entire lower surface. Also, the edges of the upper surface of the bottom transparent substrate 20, are provided with two trenches 25 and 26. A bottom conductive film 22 is coated on the entire upper surface. The formation method of the trench is not limited. For example, the trench can be formed using a mold or by etching.

The top and bottom conductive films 12 and 22 are used as resistive layers and can be ITO (indium tin oxide), tin oxide, or ATO (antimony-tin-oxide) having a resistance of 10 to 10,000 ohms per square, and preferably 100 to 1000 ohms per square. The insulating spacer 60 is disposed between the conductive film 12 of the top transparent substrate 10 and the conductive film 22 of the bottom transparent substrate 20 for separating these two conductive films.

The signal lines can be metal lines such as silver lines and can include four signal sensing lines, two top signal sensing lines 31 and 32 disposed on two opposite edges of the top conductive film 12, and two bottom signal sensing lines 41 and 42 disposed on two opposite edges of the bottom conductive film 22. The bottom signal sensing lines 41 and 42 are arranged at a right angle to the top signal sensing lines 31 and 32. The signal lines can further include four signal transmission lines 31a, 32a, 41a, and 42a, which are connected to the signal sensing lines 31, 32, 41, and 42 respectively and are finer than the signal sensing lines.

The feature of the present invention resides in that at least one signal line is disposed on the top conductive film in the trench of the top transparent substrate, or disposed on the bottom conductive film in the trench of the bottom transparent substrate. Taking FIG. 4a as an example, the signal transmission line 32a is disposed on the top conductive film 12 in the trench 15 of the top transparent substrate 10, and the signal sensing lines 41 and 42 are disposed on the bottom conductive film 22 in the trenches 25 and 26 of the bottom transparent substrate 20. In FIG. 4a, trenches 15 and 26 are alternatively aligned; therefore, signal lines 32a and 42 are also alternatively aligned.

An adhesive 50 such as a double-sided adhesive is used to separate the signal line 41 and the top conductive film 12 and to separate the signal lines 32a and 42. The area on the edges of the panel, in which signal lines are located, is referred to as a signal line area labeled "S". The area outside the signal line area is an active area (AA). To aid in understanding, the width ratio of the signal area S in FIG. 4a is magnified in comparison with FIG. 3.

When the top transparent substrate 10 is touched by an external agent, such as a finger or stylus, electric contact occurs between the two conductive films 12 and 22, thus generating electric voltage. The signal is sensed by the signal sensing lines 31, 32, 41 and 42, which is then transmitted via signal transmission lines 31a, 32a, 41a, and 42a.

According to the present invention, when a signal sensing lines are designed to be disposed in a trench of a transparent substrate, it is preferable that the connected signal transmission line is disposed in the same trench. For example, referring to FIGS. 3 and 4a, the trench 25 can be designed to be on two edges at a right angle to the upper surface of the bottom transparent substrate 20, in order to accommodate the signal sensing line 41 and the finer signal transmission line 41a. Moreover, the trench 15 can be designed to be on two edges at a right angle to the lower surface of the top transparent substrate 10, in order to accommodate the signal sensing line 32 and the finer signal transmission line 32a.

Figure 4B:
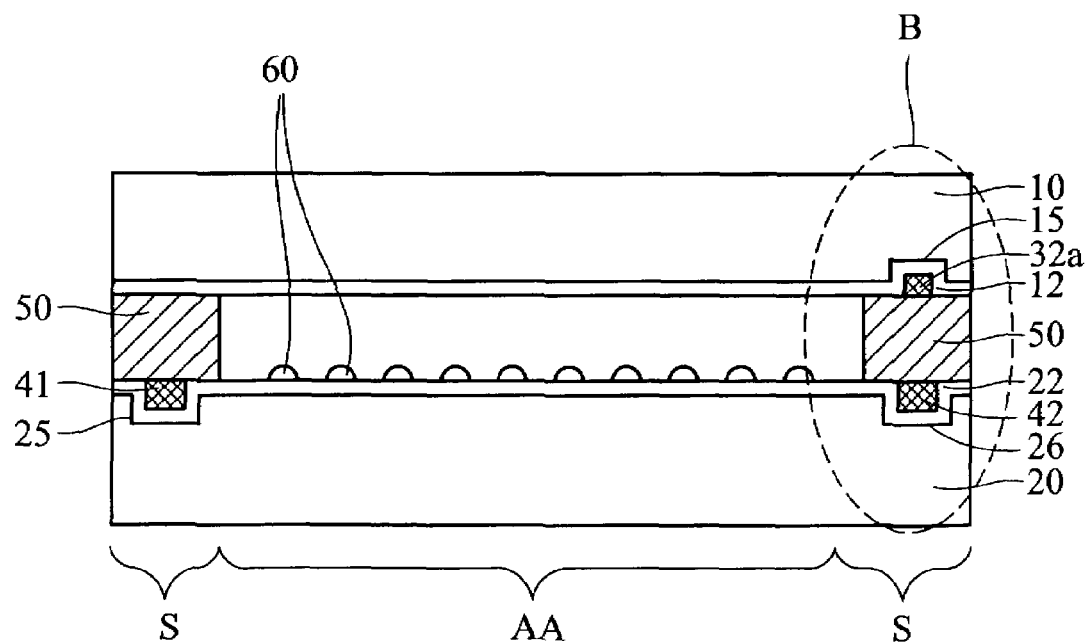
FIG. 4b is a cross-section taken along line A–A' of FIG. 3, showing the correspondingly aligned signal lines on top and bottom layers.

Moreover, according to the present invention, the trenches 15 and 26 can be designed to be correspondingly aligned, so that the signal lines 32a, and 42 are correspondingly aligned as shown in FIG. 4b. Thus, the signal line area S will have a decreased width, thus increasing the space occupied by the active area AA. Since the signal lines 32a and 42 are embedded in the trenches and do not protrude, a short circuit can be prevented.

Figure 5A:
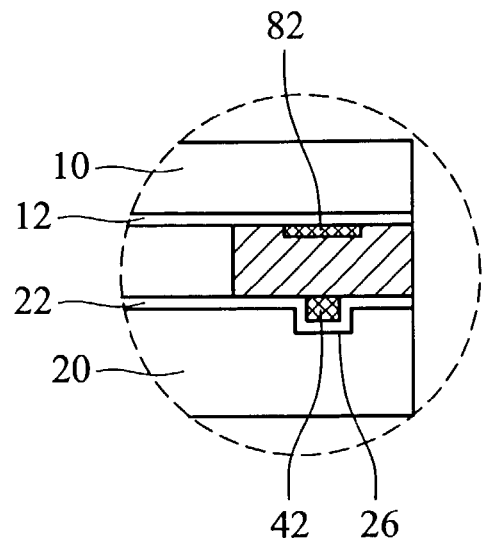
FIGS. 5a to 5d are cross-sections of touch panels according to other preferred embodiments of the present invention, showing different arrangements of the signal lines in part B of FIG. 4b.

FIGS. 5a to 5d are cross-sections of touch panels according to other preferred embodiments of the present invention, showing different arrangements of the signal lines in part B of FIG. 4b. As shown in FIG. 5a, a trench 26 is disposed on the edge of the upper surface of the bottom transparent substrate 20, and the signal line 42 is disposed on the bottom conductive film 22 in the trench 26. However, on the edge of the lower surface of the top transparent substrate 10, no trench is formed, and the signal line 82 is on the flat surface of the top conductive film 12.

Figure 5C:
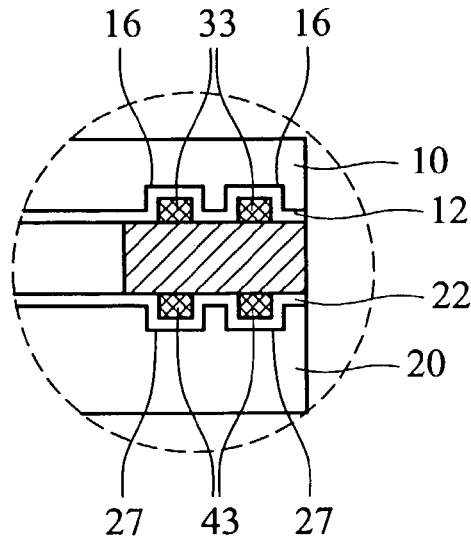
Figure 5B:
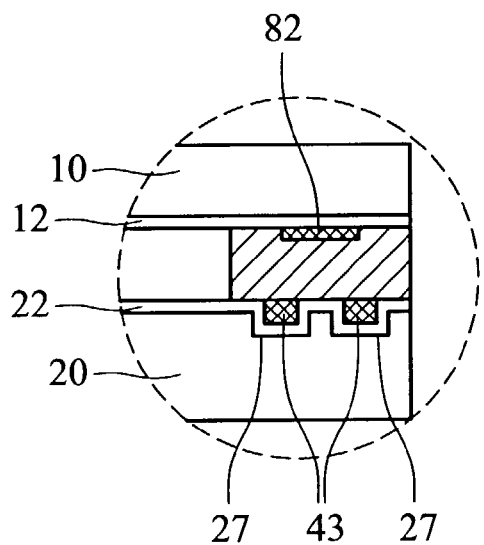

As shown in FIG. 5b, in part B of FIG. 4b, two trenches 27 are disposed on the edge of the upper surface of the bottom transparent substrate 20, and two signal lines 43 are disposed on the bottom conductive film 22 in the trenches 27. However, on the edge of the lower surface of the top transparent substrate 10, no trench is formed, and the signal line 82 is on the flat surface of the top conductive film 12.

As shown in FIG. 5c, in part B of FIG. 4b, two trenches 16 are disposed on the edge of the lower surface of the top transparent substrate 10, and two signal lines 33 are disposed on the top conductive film 12 in the trenches 16. Two trenches 27 are disposed on the edge of the upper surface of the bottom transparent substrate 20, and two signal lines 43 are disposed on the bottom conductive film 22 in the trenches 27.

Figure 5D:
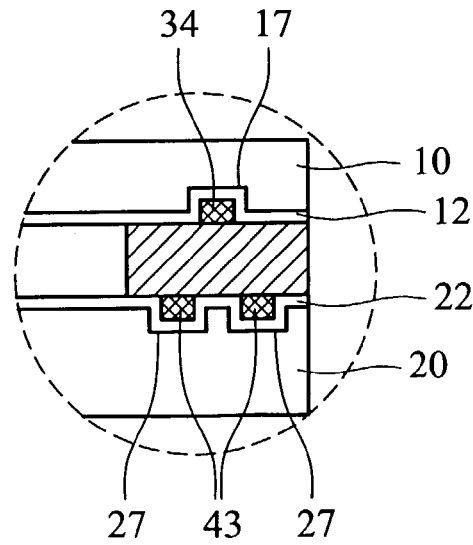

As shown in FIG. 5d, in part B of FIG. 4b, a trench 17 is disposed on the edge of the lower surface of the top transparent substrate 10, and a signal line 34 is disposed on the top conductive film 12 in the trench 17. Two trenches 27 are disposed on the edge of the upper surface of the bottom transparent substrate 20, and two signal lines 43 are disposed on the bottom conductive film 22 in the trenches 27.

As can be seen from the above preferred embodiments, some signal lines are disposed in trenches of the transparent substrates 10 or 20. Therefore, compared with the signal line arrangements of the conventional touch panel, the present invention has the following advantages.

(1) The signal line is designed to be in the trench of the transparent substrate and the adhesive 50 is used to fasten the flat surfaces, thus it offers good reliability.

(2) The signal line is disposed in the trench of the transparent substrate, thus the signal line can be thickened, while not increasing the thickness of the entire panel. Therefore, the signal line can be narrowed, while maintaining the required conductivity. Therefore, the panel of the present invention has a decreased width of the signal line area S, thus decreasing the overall appearance size.

(3) When the signals in the trenches of the top and bottom transparent substrates are designed to be correspondingly aligned (as shown in FIG. 4b), the width of the signal line area S can be further reduced, which in turn reduces the overall size. Since the signal lines are in the trenches of the transparent substrates and do not protrude, short circuits between the signal lines can be prevented.

Although a four-line touch panel is taken as an example in the above descriptions, the present invention is also suitable for use in five-line, six-line, or eight-line type touch panels.

In conclusion, in the touch panel of the present invention, the edge of the transparent substrate is designed to have a trench, and the signal line (silver line) is disposed in the trench. Therefore, the silver line can be made thicker and narrower. Thus, the silver line occupies less surface area, resulting in a smaller appearance. Moreover, the silver line maintains high conductivity, resulting in good reliability.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A touch panel comprising:
   a top transparent substrate coated with a top conductive film on its lower surface;
   a bottom transparent substrate coated with a bottom conductive film on its upper surface;
   an insulating spacer located between the two conductive films of the top and bottom transparent substrates to separate the two conductive films, wherein when the top transparent substrate is touched by an external force, electric contact occurs between the two conductive films; and
   a plurality of signal lines, wherein each signal line is disposed on an edge of the top or bottom conductive film and is separated from another conductive film or another signal line by an adhesive,
   wherein a first trench, recessed into the top transparent substrate, is provided on an edge of the lower surface of the top transparent substrate and a signal line is disposed on the top conductive film in the first trench, or a second trench, recessed into the bottom transparent substrate, is provided on an edge of the upper surface of the bottom transparent substrate and a signal line is disposed on the bottom conductive film in the second trench.

2. The touch panel as claimed in claim 1, wherein the top and bottom transparent substrates are glass or plastic.

3. The touch panel as claimed in claim 2, wherein the top and bottom transparent substrates are polyester plastic.

4. The touch panel as claimed in claim 2, wherein the top and bottom transparent substrates are flexible plastic.

5. The touch panel as claimed in claim 1, wherein the signal lines are metal lines.

6. The touch panel as claimed in claim 1, wherein a first trench is provided on an edge of the lower surface of the top transparent substrate and a signal line is disposed on the top conductive film in the first trench, and a second trench is provided on an edge of the upper surface of the bottom transparent substrate and a signal line is disposed on the bottom conductive film in the second trench.

7. The touch panel as claimed in claim 1, wherein the plurality of signal lines includes:
   two top signal sensing lines disposed on two opposite edges of the top conductive film;
   two bottom signal sensing lines disposed on two opposite edges of the bottom conductive film;
   wherein the top signal sensing line and the bottom signal sensing line are arranged at a right angle.

8. The touch panel as claimed in claim 7, wherein a plurality of signal lines further include four signal transmission lines connected to the signal sensing lines respectively.

9. The touch panel as claimed in claim 8, wherein the lower surface of the top transparent substrate is provided with a trench on two edges arranged at a right angle, and a signal sensing line and a signal transmission line are disposed on the top conductive film in the trench.

10. The touch panel as claimed in claim 8, wherein the top surface of the bottom transparent substrate is provided with a trench on two edges arranged at a right angle, and a signal sensing line and a signal transmission line are disposed on the bottom conductive film in the trench.

11. The touch panel as claimed in claim 1, wherein the conductive film is indium tin oxide (ITO).

12. The touch panel as claimed in claim 1, wherein the adhesive is a double-sided adhesive.

13. A touch panel comprising:
   a first transparent substrate having a first trench recessed into a first surface thereof;
   a first conductive film coated onto the first surface and the first trench;
   a second transparent substrate having a second surface facing the first surface;
   a second conductive film coated on the second surface facing the first conductive film;
   an insulating spacer located between and separating the two conductive films, wherein the first transparent substrate, the second transparent substrate, and the insulating spacer are arranged such that deformation of one of the first or second transparent substrates towards the other causes electrical contact to occur between the first and second conductive films; and
   a first signal line disposed in the first trench.

14. The touch panel as claimed in claim 13, wherein the first trench is located at an edge of the first conductive film.

15. The touch panel as claimed in claim 13, further comprising an adhesive disposed between the first transparent substrate and the second transparent substrate separating the first signal line from the second conductive film.

16. The touch panel as claimed in claim 13, further comprising:
   a second trench formed recessed into the second surface of the second transparent substrate, wherein the second conductive film coats the second trench;
   a second signal line disposed in the second trench.

17. The touch panel as claimed in claim 16, wherein the second trench is located at an edge of the second conductive film.

18. The touch panel as claimed in claim 16, further comprising an adhesive disposed between the first transparent substrate and the second transparent substrate separating the first signal line from the second signal line.

* * * * *